Nov. 24, 1931.   R. L. GARNETT   1,833,159
ROLLING HINGE GEAR
Filed March 10, 1930
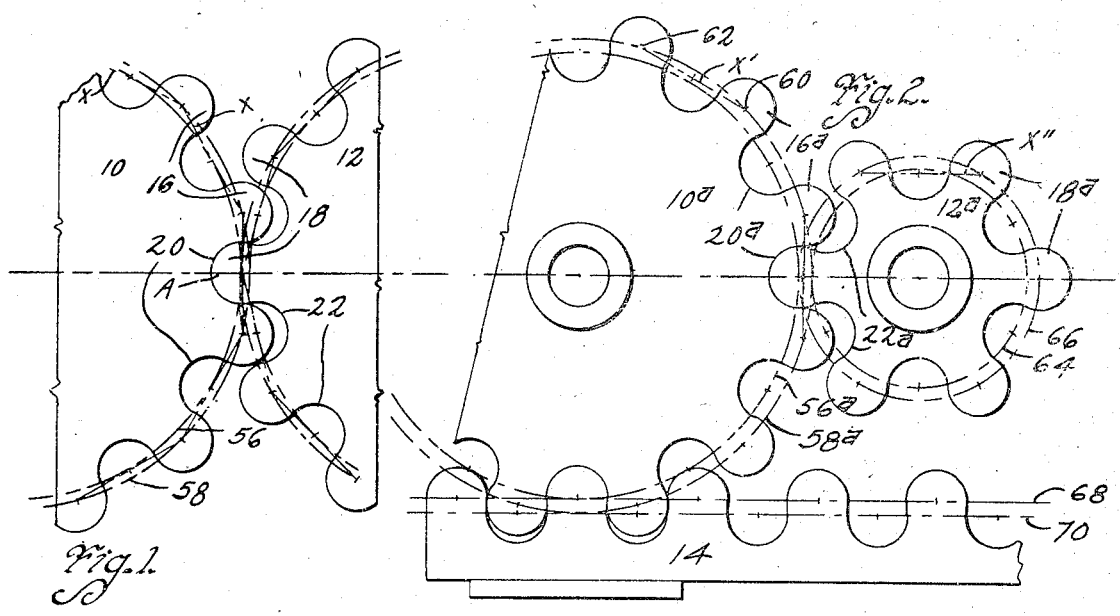
Fig. 1. Fig. 2.
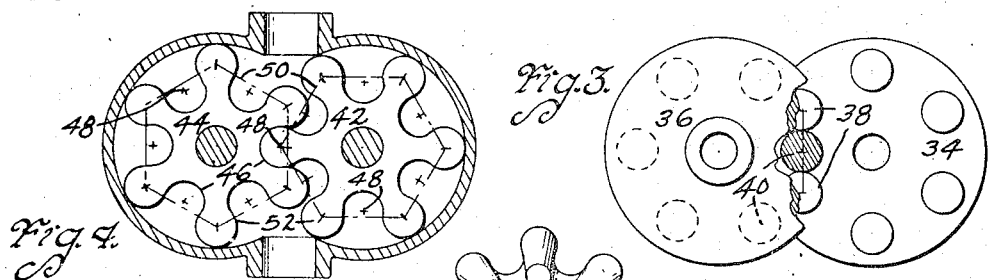
Fig. 4. Fig. 3.
Fig. 6.
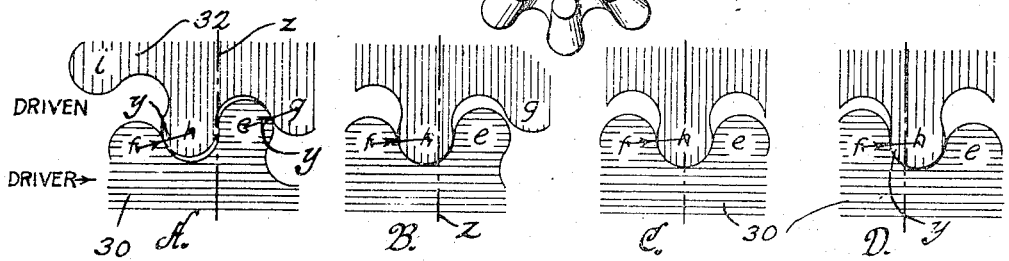
Fig. 5.
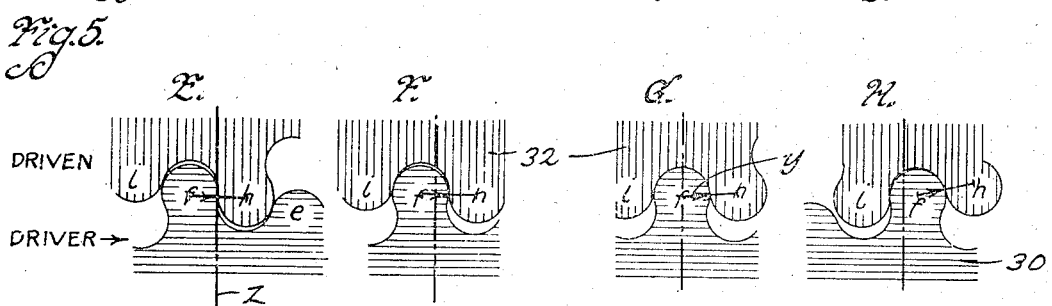
Inventor:— Robert L. Garnett
By Bair, Freeman & Sinclair
Attorneys
Witness
Edw. Seeley Patented Nov. 24, 1931

1,833,159

UNITED STATES PATENT OFFICE

ROBERT L. GARNETT, OF CEDAR RAPIDS, IOWA

ROLLING HINGE GEAR

Application filed March 10, 1930. Serial No. 434,676.

The object of my invention is to provide a gear structure of simple, durable and inexpensive construction, which I have, for the sake of a distinguishing term, called a rolling hinge gear.

A further object of my present invention is to provide a gear of peculiar structure with teeth shaped and arranged in novel manner whereby a number of advantages, including closer engagement, greater strength, reduced liability of stripping, elimination of climbing, simplicity of movement, minimum friction and minimum wear are secured.

Still a further object is to provide gears meshed with each other or with rack bars or the like, the teeth of the respective gears or rack bars being shaped like partial surfaces of true cylinders and meshed to such a depth that during operation, the application of force from one tooth to another will be always at right angles to the engaging portions of both the teeth and the notches and will have a minimum variation from right angles to a line between the axes of the gears or a line through the axis of a gear and at right angles to a rack bar as the case may be whereby the force is applied in the most desirable manner to reduce friction and increase efficiency.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of parts of two gears embodying my invention, the gears being of equal diameters.

Figure 2 is a plan view of a pair of gears of different relative sizes and a rack bar abutting one of the gears.

Figure 3 is a similar view of a pair of pin gears illustrating the same general principle of construction.

Figure 4 is a sectional view illustrating a pair of such gears arranged for use in a rotary pump.

Figure 5, details A-B-C-D-E-F-G and H inclusive are diagrammatic views illustrating the successive steps taken in the rotation of a driver and a driven gear of the kind embodying my invention.

Figure 6 is a plan view of a bevel gear embodying my invention.

In Figure 1 I have shown a pair of gears indicated generally by the reference numerals 10 and 12 arranged in mesh with each other. Each figure of the drawings illustrates my invention as applied to various sizes and types of gears of the kind shown in Figure 1 and embodying the same general principles of gear tooth construction.

The teeth 16 of the gear 10 and the teeth 18 of the gear 12 are formed with their outer surface portions laid out from centers whereby transverse cylinders are formed, or if we take the view of Figure 1 as shown, considering the gears to lie on a plane, then the outer part of each tooth is arranged as a part of a true circle.

Similarly, the notches 20 and 22 between the successive teeth 16 and 18 of the respective gears 10 and 12 are likewise of the same shape as the teeth, i. e. half circles. A line $x$ drawn from center to center of the teeth mentioned is indicated on the gear 10 in Figure 1. This line if extended from center to center of the respective teeth 16, will pass through the center of the circle on which the intermediate notch is formed. Thus we have the gears provided with teeth, the engaging portions of which are formed in the shape of partial true cylinders. The intermediate notches of one gear are arranged to receive and interfit with the teeth of a meshing gear. The meshing gears are journalled in such manner that in the travel of the gears the teeth of one gear will so enter the notches of the other gear that when the engaging tooth of one gear, as at A, Figure 1, is exactly centered on the line from center to center of the gears it will progress a full one-half cylinder into the corresponding notch of the other gear.

In the case of pumps this projection may be even greater as illustrated in Figure 4 and explained hereinafter. The diagrams in Figure 5 (details A-B-C-D-E-F-G-H)

illustrate the operators of gears of the structure just mentioned.

In the diagrams, 30 illustrates the driving gear having the teeth $e, f$ and 32 indicates the driven gear having the teeth $g, h, i$. In detail A the gears are shown at the point in their movement where driving power shifts from where it has been applied from the tooth $e$ to the tooth $g$ to where the power is applied from tooth $f$ to the tooth $h$. It will be observed that the force is applied on the lines of the radii of the respective teeth, to wit: on the line $y$ from center to center of the driving and the driven tooth. The line $z$ is a reference line from center to center of the driving and driven gears to show the relative progression of the teeth 30 and 32.

At the step in the movement as illustrated in detail A, the teeth have rolled upon each other the maximum amount, but the line of force as applied upon the tooth $h$ is still from center to center of the gear teeth.

Progressing from position to position as illustrated in details B to H inclusive, it will be seen that during the complete cycle of movement the line of force is always applied on the line $y$ from center to center between the engaged and the engaging teeth and is thus always at right angles to the engaging faces.

In Figure 3 I have illustrated gears of the pin type. There are shown here some gears 34 and 36 having the oppositely projecting cylindrical teeth 38 and 40. These teeth or pins 38 and 40 are in the form of true cylinders and the gears are arranged on centers such that the teeth roll on each other in the same way as the teeth of the gears 10 and 12, and as illustrated in the diagrams of Figure 5.

In Figure 4 I have shown a form of gear structure used for rotary pumps in which the notches are still deeper than shown in Figure 1 to afford greater capacity in a pump. Thus in the form shown in Figure 4 I have illustrated the gears 42 and 44. The notches 46 of the gear 44 are so deep that their centers as at 48 are located inwardly from the line 50 between the centers of the teeth 52 but are of a width equal to the diameter of a tooth. This necessitates a straight connecting portion between the teeth circles and notch circles as indicated by the dimension $v$.

In Figure 6 I have illustrated a gear 54 of the beveled type embodying the principle of the invention herein explained.

A gear structure of the kind herein set forth has a large number of advantages. End and pin thrust are reduced or eliminated; there is secured a rolling or pivoted movement; there is no sliding of gears, or gears with frictional movement. I am able thus to practically eliminate the ordinary "hum" of gears of the "involute" or ordinary type now in general use. This structure also produces a gear of greater strength than those of the ordinary type operating with a minimum of friction and hence with the least tendency to heat and without the grinding and noise of ordinary gears. The gears roll upon each other, with the teeth being of equal diameters, always applying force from the driving to the driven gear along lines from tooth center to tooth center. The gears may be embodied in different forms, as for instance, in Figures 1, 2, 3 and 6.

In Figure 2 I have illustrated a pair of meshing gears of different diameters. A problem arises in connection with the laying out of teeth for such gears which is not present in the laying out of gear teeth where the gears are of equal size as in Figure 1. The gear 10a is illustrated as the same pitch diameter as the gear 10 but it will be noted that center lines 56a and 58a which correspond to center lines 56 and 58 of Figure 1 are farther apart. These are the center lines from which the semicircular teeth 16a and notches 20a are laid out. At the upper right hand part of the gear 10a a line $x'$ is indicated drawn between the centers 60 and 62 of two adjacent teeth 16a, the same as the line $x$ on the gear 10 to illustrate that the notches 20a drawn from the center line 56a are comparative deeper than on the gear 10.

It will be noted that a line $x''$ between two adjacent teeth 18a of the gear 12a passes through the intermediate notch 22a closer to the axis of the gear than a center line 64 from which the notches 22a are laid out. Thus it will be seen that if in gears of different sizes the idea of laying the gear notches out on a line between the center of the teeth is adhered to, the notch on the smaller gear will be deeper than the notch on the larger gear.

Therefore, a compromise is made between the dimensions so that the notches on the smaller gear are made shallower and the notches on the larger gear are made deeper than when the gears are of the same size so that actually as shown in Figure 2, the notches and teeth are of the same size and depth for proper full mesh as will be readily seen by the center lines 56a and 58a being tangent with the center lines 66 and 64 respectively.

This variation, however, does not depart from the most important consideration for laying out the gears which is to mesh the teeth to such a depth that during operation the application of force from one tooth to another will have a minimum variation from right angles to a line between the axes of the gears. The lines $y$ in Figure 5 indicate how nearly the application of force remains in a line at right angles to the line $z$ between the axes of the meshing gears. The greatest variation is shown in detail A from which the variation decreases in details B, C and D until in detail E it is exactly at right angles to the line z.

The application of force then progressively varies in details F, G and H whereupon the cycle of positions begins to repeat in detail A.

I have shown a rack bar 14 in Figure 2 in which center lines 68 and 70 are tangent to the center lines 56a and 58a and the notches and teeth of the rack bar are laid out from these center lines whereby accurate and full mesh of the gear and rack bar are accomplished.

It is obvious that there may be variations in the form of the teeth and it is my intention to cover by my claims any modifications in structure which may be reasonably included within their scope.

I claim as my invention:

1. In a gear structure, a pair of meshed gears, the teeth and notches of the respective gears being shaped like partial surfaces of true cylinders, the teeth and notches of the respective gears being meshed relative to each other to such a depth that during operation, the application of force from one tooth to another will have a minimum variation from right angles to a line between the axes of the gears.

2. A pair of gears having teeth and notches, each shaped on the arc of a circle, the center from which a tooth of one gear is laid out, when coincident with an axis center line between the axes of the gears, lying substantially on a tooth center line between the centers from which two adjacent teeth of the other gear are laid out, said axis and tooth center lines being at right angles to each other.

3. A pair of gears having teeth and notches, each shaped on the arc of a circle, the center from which a tooth of one gear is laid out, when coincident with an axis center line between the axes of the gears, lying closer to the axis of the other gear than a tooth center line between the centers from which two adjacent teeth of the other gear are laid out and the center from which the other gear is laid out, when coincident with said axis center line, lying closer to the axis of the other gear than a second tooth center line between the centers from which two adjacent teeth of the first gear are laid out.

Des Moines, Iowa, February 27, 1930.

ROBERT L. GARNETT.